United States Patent [19]

Barbagelata et al.

[11] 4,099,233

[45] Jul. 4, 1978

[54] ELECTRONIC DATA-PROCESSING SYSTEM WITH DATA TRANSFER BETWEEN INDEPENDENTLY OPERATING MINIPROCESSORS

[75] Inventors: Giuseppe Barbagelata, Genoa; Bruno Conterna, Genoa-Rivarolo; Mauro Giraudi, Savona; Luigi Stringa, Arenzano (Genoa), all of Italy

[73] Assignee: Elettronica San Giorgio-ELSAG S.p.A., Genoa-Sestri, Italy

[21] Appl. No.: 735,219

[22] Filed: Oct. 26, 1976

[30] Foreign Application Priority Data

Oct. 24, 1975 [IT] Italy .............................. 69631 A/75

[51] Int. Cl.² .......................... G06F 15/16; G06F 1/04
[52] U.S. Cl. .................................................... 364/200
[58] Field of Search ........................................ 364/200

[56] References Cited

U.S. PATENT DOCUMENTS

| | | | |
|---|---|---|---|
| 3,219,980 | 11/1965 | Griffith | 364/200 |
| 3,263,219 | 7/1966 | Brun | 364/200 |
| 3,286,236 | 11/1966 | Logan | 364/200 |
| 3,421,150 | 7/1969 | Quosig | 364/200 |
| 3,634,830 | 1/1972 | Baskin | 364/200 |
| 3,753,234 | 8/1973 | Gilbert | 364/200 |
| 4,007,441 | 2/1977 | Faber | 364/200 |

Primary Examiner—James D. Thomas
Attorney, Agent, or Firm—Karl F. Ross

[57] ABSTRACT

A multiplicity of independently operating miniprocessors of an electronic data-processing system are grouped in a number of subsystems each including an individual control unit for carrying out an exchange miniprogram, upon request by an originating miniprocessor of its own subsystem, involving a series of data transfers between a transmitting and a receiving miniprocessor of the same or of a different subsystem. The control unit assigns to each exchange request a certain priority level, determined by the time of arrival of the request and by the location of the originating miniprocessor, and establishes an order of precedence in which data blocks are transferred between different pairs of miniprocessors in a time-division mode.

10 Claims, 4 Drawing Figures

ELECTRONIC DATA-PROCESSING SYSTEM WITH DATA TRANSFER BETWEEN INDEPENDENTLY OPERATING MINIPROCESSORS

FIELD OF THE INVENTION

Our present invention relates to an electronic system in which a multiplicity of digital processing units, provided with individual data stores, operate independently but can also be engaged in a data transfer from one unit to another.

BACKGROUND OF THE INVENTION

In an associative data-processing system, the several processing units have their own operating cycles within which they examine data fed in by associated peripheral equipment to check for the occurrence of certain characteristics for which they are programmed. In its search for a given combination of such characteristics, the system must correlate the operations of these individual units or miniprocessors by the selective exchange of data among them, such exchange being initiated from time to time by one of the miniprocessors which may or may not be one of the processing units between which data are to be transferred. In a complex system, e.g. one used for traffic control in a large metropolitan area, the system is conveniently subdivided into a plurality of subsystems each including a number of miniprocessors which must, on occasion, communicate not only with one another but also with their counterparts in other subsystems.

In contrast to serially operating processing systems, whose performance is relatively time-consuming, those operating in parallel can carry out their tasks in reasonably short working periods but conventionally require cumbersome and expensive switching arrangements for their correlation.

OBJECTS OF THE INVENTION

The primary object of our present invention, accordingly, is to provide an improved data-processing system of the general character set forth which is speedy, efficient and reliable in carrying out an unlimited number of operations at a higher rate than heretofore possible.

A more particular object is to provide a system of this character whose individual units can be of modular construction, thus enabling relatively inexpensive mass production thereof.

A further object of our invention is to provide a highly flexible data-processing system, operating in real time, which is adaptable to a wide range of circumstances varying as to information content, logistics and timing.

SUMMARY OF THE INVENTION

In acccordance with our present invention, a plurality of mutually independent miniprocessors (also referred to hereinafter as processing units) with individually programmed operating cycles are associated with a common control unit provided with a timing circuit for establishing, in response to a request from an originating miniprocessor, an operating sequence — termed a miniprogram — for a data exchange involving one or more data transfers between a transmitting and a receiving miniprocessor so designated by the originating miniprocessor. The latter may or may not be identical with the transmitting or with the receiving miniprocessor. Data read out from the data store of the transmitting miniprocessor, during a first phase of a transfer cycle forming part of the exchange miniprogram, are temporarily stored in a buffer register of the control unit and are forwarded during a second phase of that cycle to the data store of the receiving miniprocessor. The transfer to and from the control unit is facilitated by circuit means linking the control unit with the associated miniprocessors for enabling the exchange of data and supervisory signals therewith.

More particularly, according to another feature of our invention, the control unit comprises several registers, two of them designed at least in part as accumulators whose contents can be updated (i.e. incremented or decremented) by counting pulses from the timing circuit. These registers serve for temporarily storing, during performance of the miniprogram, instructions from the originating miniprocessor relating to the data exchange, accompanied by the identities of the two or three miniprocessors involved. Since requests for a data exchange may come from other miniprocessors while data transfers are still in progress, each instruction register of the control unit is preferably divided into a plurality of stages for the concurrent storage of information relating to different miniprograms which are performed in a time-division mode following an order of precedence in conformity with various priority levels assigned to these miniprogrms by the timing means, e.g. on the basis of time of arrival of the requests and location of the originating microprocessors in the system.

Pursuant to a further feature of our invention, the several miniprocessors are grouped in a plurality of subsystems each with its own control unit. In responding to an exchange request from an associated originating unit in its own subsystem involving a transmitting unit and/or a receiving unit in another subsystem, the control unit enlist the services of a transmitting interface in its subsystem and a receiving interface in the other subsystem to establish the necessary connections. The subsystems are preferably interconnected in a cyclic sequence, their transmitting and receiving interfaces being interlinked by branch connections forming a closed circuit for one-way data transmission from the control unit of any subsystem to any miniprocessor of any other subsystem, and vice versa.

BRIEF DESCRIPTION OF THE DRAWING

The above and other features of our invention will now be described in detail with reference to the accompanying drawing in which.

SPECIFIC DESCRIPTION

Figure 1:
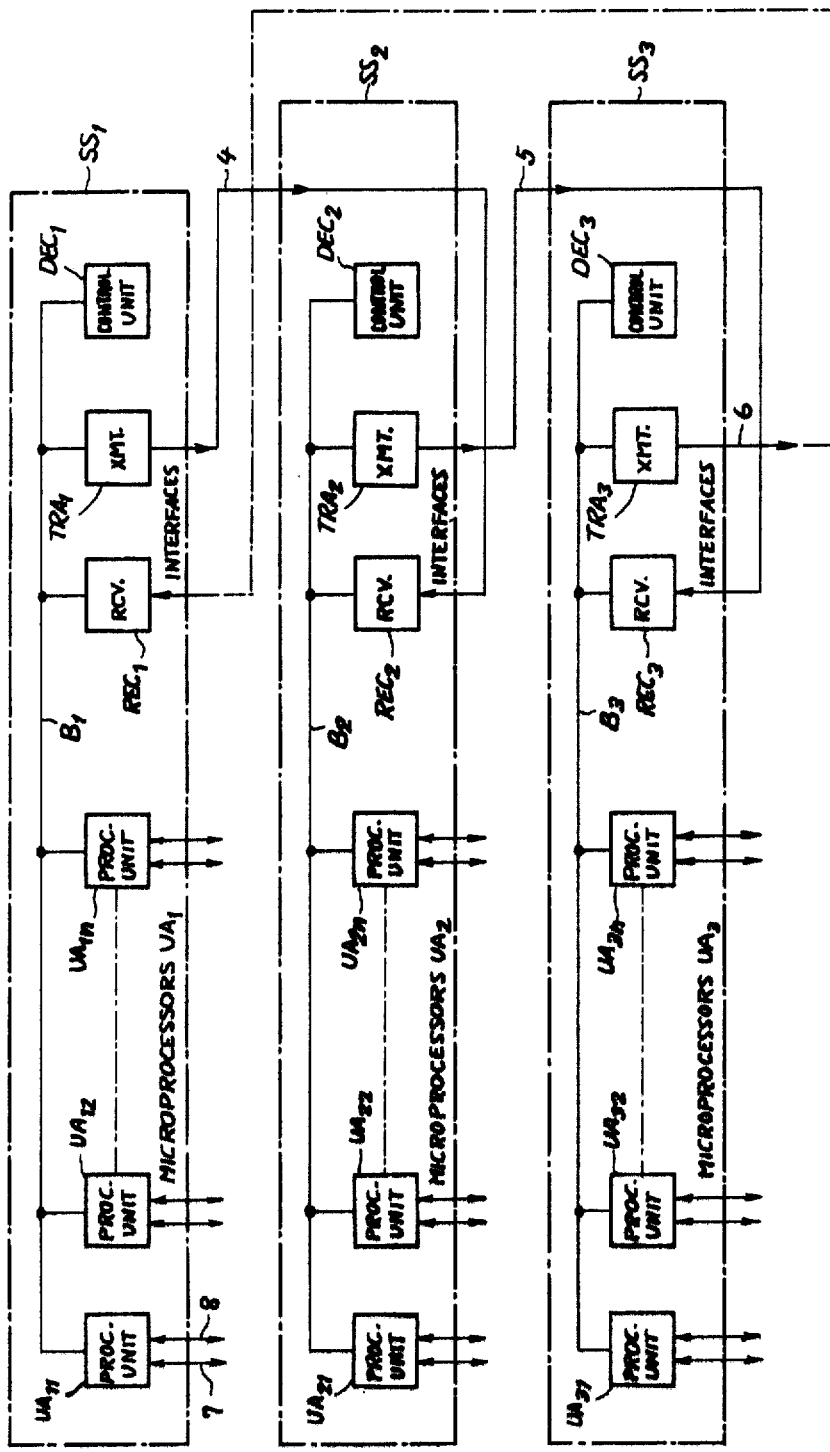
FIG. 1 is a block diagram showing, in simplified form, a data-processing system embodying our invention.

In FIG. 1 we have shown the overall layout of a data-processing system according to our invention, divided into a number of substantially identical subsystems of which only three, designated $SS_1$, $SS_2$ and $SS_3$, have been illustrated. Each subsystem includes a plurality of processing units, i.e. a group of miniprocessors $UA_1$ individually labeled $UA_{11}$, $UA_{12}$, ... $UA_{1n}$ in subsystem $SS_1$, a group of miniprocessors $UA_2$ individually labeled $UA_{21}$, $UA_{22}$, ... $UA_{2n}$ in subsystem $SS_2$, and a group of miniprocessors $UA_3$ individually labeled $UA_{31}$, $UA_{32}$, ... $UA_{3n}$ in subsystem $SS_3$.

Each miniprocessor is autonomous in its operation but can temporarily communicate with any other miniprocessor, in its own or a different subystem, by way of an associated control unit DEC (FIG. 3) individually designated $DEC_1$, $DEC_2$ and $DEC_3$ for the three subsystems shown. Each subsystem also has a transmitting interface $TRA_1$, $TRA_2$, and $TRA_3$ and a receiving interface $REC_1$, $REC_2$, $REC_3$.

All the miniprocessors of a subsystem are linked with one another and with the associated control unit DEC as well as with the corresponding transmitting and receiving interfaces through a common bus in the form of a bidirectional conductor multiple, these buses being designated $B_1$, $B_2$ and $B_3$ in the several subsystems $SS_1$, $SS_2$ and $SS_3$. A dialogue between units of different subsystems is facilitated by branch multiples interlinking their transmitting and receiving interfaces, i.e. a connection 4 between interfaces $TRA_1$ and $REC_2$, a connection 5 between interfaces $TRA_2$ and $REC_3$, and a connection 6 completing a circuit from interface $TRA_3$ to interface $REC_1$ either directly or by way of the transmitting and receiving interfaces of additional subsystems not shown. The arrows of lines 4, 5 and 6 indicate the direction of data flow from one subsystem to the next but do not symbolize one-way connections inasmuch as supervisory binary signals may pass over these lines in either direction. These supervisory signals will include transfer instructions, such as the addresses of processing units to be engaged in a data exchange, along with other information as more particularly discussed hereinafter, as well a timing signals and signals indicating the availability of a given unit to participate in a new exchange miniprogram. Further bidirectional connections extending from each miniprocessor include a line 7, providing communication with external data-storage facilities, and a line 8 for the exchange of information and control signals with peripheral equipment not shown.

If a processing unit in, say, group $UA_1$ wishes to initiate a data transfer, it signals its request via bus $B_1$ to control unit $DEC_1$, identifying the unit from which data are to be transmitted and the one by which these data are to be received. The control unit, taking up that request in the order of preference determined by the priority level which is assigned to it, then notifies the transmitting unit $UA_t$ and the receiving unit $UA_r$, either of which may or may not be identical with the request-originating unit $UA_o$. Transmitting interface $TRA_1$ intervenes if one or both units $UA_t$, $UA_r$ are located in different subsystems. In order to reach a unit in group $UA_3$, for example, control unit $DEC_1$ will send out signals via bus $B_1$, interface $TRA_1$, line 4, interface $REC_2$, bus $B_2$, interface $TRA_2$, line 5 and interface $REC_3$ to bus $B_3$; return signals from that processing unit will go to control unit $DEC_1$ by way of bus $B_3$, interface $TRA_3$, line 6, interface $REC_1$ and bus $B_1$. Transmitting and recieving interfaces $TRA_1$- $TRA_3$ and $REC_1$ - $REC_3$ are all conventional devices of identical modular construction.

After the data-exchange miniprogram has been completed, or possibly between data transfers thereof, the involved units $UA_o$, $UA_t$ and $UA_r$ resume their independent operations.

Figure 2:
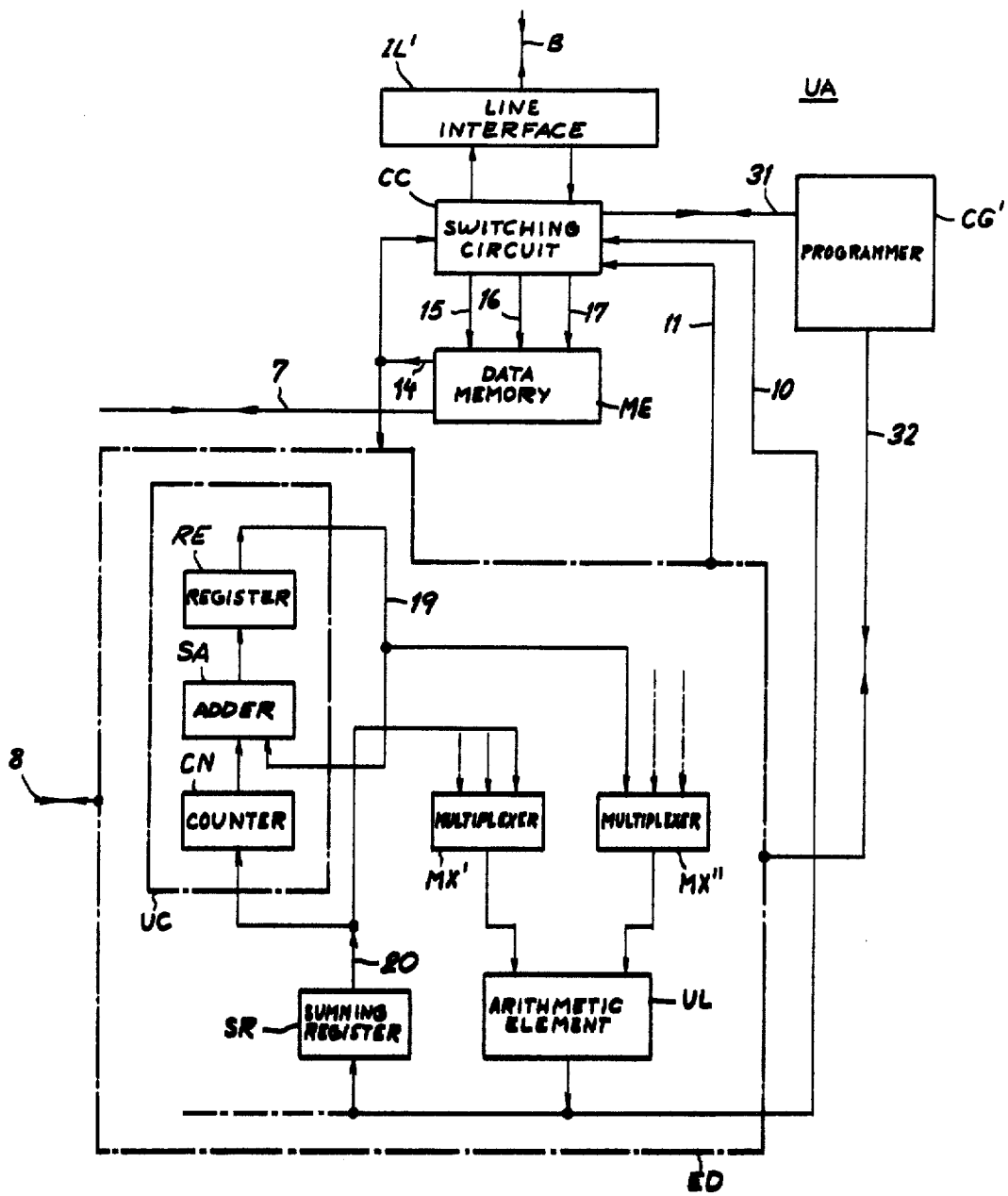
FIG. 2 is a block diagram of an individual processing unit or miniprocessor forming part of the system of FIG. 1.

In FIG. 2 we have shown a representative processng unit UA which is essentially a conventional, general-purpose minicomputer. The unit has a line interface IL' connected to the associated bidirectional multiple or bus B and to a switching circuit CC which controls the loading and unloading of a data memory ME via a set of connections 15 - 17. Connection 15 carries read/write instructions, connection 16 provides the addresses of the memory stages to which these instructions apply, and connection 17 supplies the data to be stored in those stages. Data read out from memory ME appear on a connection 14 for transmission to bus B, via circuits CC and IL', and/or to an operational section ED constituted by printed circuitry. Memory ME is also shown connected to line 7 for possible expansion of its storage capacity.

A programmer CG' communicates with switching circuit CC and operational section ED via two-way connections 31 and 32, respectively. Data to be stored in memory ME are delivered to switching circuit CC from section ED on a line 10 while the corresponding stage addresses are sent to that switching circuit on a line 11. Communication between section ED and external peripheral equipment takes place over the aforementioned two-way connection 8.

Operational section ED incudes a subunit UC designed for the specific task performed by the miniprocessor. Subunit UC is here shown to comprise a high-speed counter CN, an arithmetic adder SA fed by that counter, and a regiser RE loaded by the adder. The contents of each register RE can be fed back to adder SA or delivered to an arithmetic element UL, under the control of programmer CG', via a multiplexer MX" sequentially scanning the several register stages. Arithmetic element UL works into the line 10 which also extends to a summing register SR having an output multiple 20 delivering its contents to the subunit UC as well as to a multiplexer MX' for bit-by-bit recirculation to element UL. The latter contains a logic gate of the anticoincidence or Exclusive-OR type in order to detect, in the usual manner, the existence of a match between bits fed in via multiplexers MX' and MX", these bits being part of words received from the outside via line 8 and read out from memory ME over connection 14. In the absence of such a match, pulses from arithmetic element UL are entered in summing register SR and advance the counter CN.

These internal operations take place independently and at the same time in the several miniprocessors UA, under the control of the respective programmers CG', until such a unit becomes involved in a data exchange. From that point on, to the end of the exchange miniprogram, its operations are at least intermittently controlled by the unit DEC associated with the originating miniprocessor.

Figure 3:
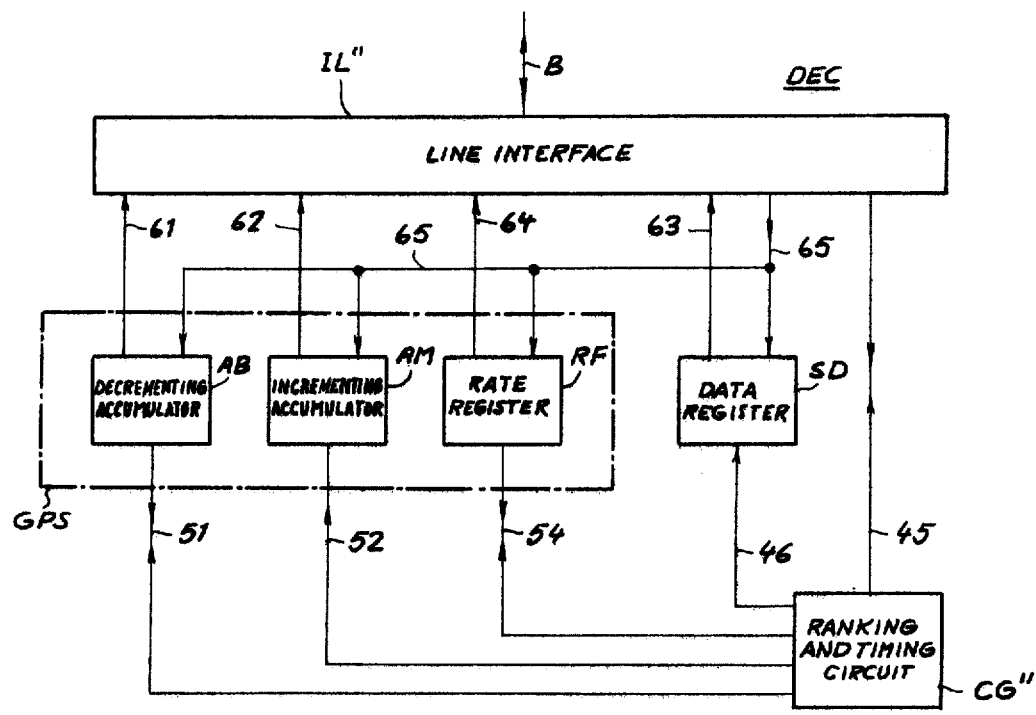
FIG. 3 is a block diagram of a control unit representative of several such units included in the system.

A representative control unit DEC, shown in FIG. 3, comprises a ranking and timing circuit CG" and several storage elements AB, AM, RF and SD, all communicating with bus B via a conventional line interface IL"'. Storage elements AB, AM and RF form part of a modular section GPS, designed for the temporary registration of transfer instructions, whereas element SD is a buffer register for data to be received from a transmitting unit $UA_t$ and retransmitted to a receiving unit $UA_r$. Timing circuit CG' communicates with line interface IL" via a connection 45 and with stores AB, AM, RF and SD by way of respective connections 51, 52, 54 and 46. Incoming signals are fed to these stores by way of a line 65, originating at interfaces IL", while outgoing signals are delivered to that interface from instruction register AB by a line 61, from instruction register AM by a line 62, from instruction register RF by a line 64 and from buffer register SD by a line 63.

Circuit CG" ranks the incoming exchange requests according to certain priority levels established on this basis of such criteria as, for example, the locations of the originating units within the system and the relative timing of the requests. Each register of section GPS has one stage for each priority level, these stages being selectively enabled by conventional circuitry in timer CG" to accept instructions according to the ranks of the corresponding exchange requests and with registration of not more than one miniprogram on any priority level. By suitable interleaving the transfer cycles of different miniprograms, the timer insures that all requested exchanges are executed as promptly as possible.

Instruction register AM and part of instruction register AB are designated as accumulators whose contents are periodically updated by timing circuit CG". The stages of register AB are subdivided into four parts each for the storage of the addresses of the originating unit $UA_o$, the transmitting unit $UA_t$ and the receiving unit $UA_r$, as well as the extent of the miniprogram, i.e. the number of data blocks to be successively transferred from the transmitting unit to the receiving unit. Each stage of register AM is divided into two parts for entry of the starting addresses of the exchange miniprogram in the data stores ME (FIG. 2) of the transmitting and receiving units, thus indicating the locations in these stores between which the first data-block transfer is to proceed. Register RF also has two-part stages for storing the exchange rate, i.e. the frequency with which the transfer of successive blocks is to take place, along with a termination code signaling the end of the miniprogram. Accumulating registers AB and AM are responsive to counting pulses from timing circuit CG" for progressively decrementing the number of transfer cycles stored in a given stage of register AB and correspondingly incrementing the addresses of the data locations stored in an associated stage of register AM. In this way, a desired series of data blocks can be transferred in as many cycles from the transmitting unit $UA_t$ to the receiving unit $UA_r$.

During a first phase of each transfer cycle, data read out from the memory ME of unit $UA_t$ are stored in register SD; during a second phase, these stored data are delivered to the memory ME of unit $UA_r$. This operation ends when the count of the corresponding accumulator stage of register AB returns to zero and signals this fact to circuit CG" which thereupon causes the rate register RF to send out the termination signal stored in the associated stage thereof.

Each miniprogram consists of an acquisition period, a transfer period and a restoration period. Whenever a unit DEC receives an exchange request from bus B via interface IL", that request is evaluated in circuit CG" which assigns it a priority level according to spatial and temporal criteria as noted above. If the stages of the storage elements AB, AM and RF in instruction section GPS corresponding to this priority level are unoccupied, circuit CG" signals the selected miniprocessor $UA_o$ (whose identification code or address is included in the request) which thereupon sends out its address over another conductor of bus B to register AB for storage in the assigned stage thereof. After register AB informs timer CG" via line 51 that this address has been properly received and entered, thus concluding a first acquisition step (a), the timer triggers the register AM by way of line 52 to send to the originating unit $UA_o$ a series of follow-up requests for additional information necessary in order to allow the exchange miniprogram to proceed. These follow-up requests may take the form of addresses of consecutive cell groups of memory ME in unit $UA_o$ from which there are read out, in seven further acquisition steps, (b) the address of the transmitting unit $UA_t$ from which data are to be transferred and which may or may not be the same as unit $UA_o$, (c) the address of the receiving unit $UA_r$ for which the data are intended and which may be identical with unit $UA_o$ if the latter is different from unit $UA_t$, (d) the number of data blocks to be transferred, (e) the address of the starting location in memory ME of unit $UA_t$ from which the first data block is to be read out, (f) the address of the corresponding location in memory ME of unit $UA_r$ in which that first data block is to be entered, (g) the exchange frequency, or rate of data transfer, and (h) a termination code signifying the end of the miniprogram.

Timer CG", which commands the emission of follow-p requests by register AM, directs the incoming exchange parameters or instructions in the order of their arrival to the assigned register stages of section GPS, i.e. instructions (a) through (d) to register AB, instructions (e) and (f) to register AM, and instructions (g) and (h) to register RF. This ends the acquisition period.

As soon as all scheduled miniprograms of higher priority level have been executed, or possibly earlier (as when a miniprocessor to be engaged in a data exchange of a hiher-ranking miniprogram is busy), circuit CG" sends out supervisory signals to the units $UA_t$ and $UA_r$, identified in the stage of register AB here considered, to determine their availability. If a return signal from these units indicates that they are free, circuit CG" commands register Am to emit at its output 62 the address of the first memory location of unit $UA_t$ from which a data block is to be read out, with simultaneous emission of the identification code of that unit by register AB. Unit $UA_t$ responds and loads the data register SD of unit DEC in a first phase of the first transfer cycle; in a second phase of that cycle, as register AB sends out the identification code of unit $UA_r$ while register AM emits the address of that unit's first memory location designed to receive the first data block, register SD forwards the data stored therein to that memory location. At the end of this first transfer cycle, the count of cycles registered in the accumulator part of register AB is diminished by one and the location addresses stored in accumulating register AM are correspondingly incremented in response to counting pulses generated by timer CG" on corresponding leads of lines 51 and 52; control unit DEC is nor ready for the second transfer cycle which occurs after a pause determined by the transfer rate inscribed in the corresponding stage of register RF. During this pause, units $UA_t$ and $UA_r$ can carry out further autonomous processing operations; if the pause is long enough, one or more transfer cycles under a miniprogram of different rank may take place in the interim.

The exchange frequency or recurrence rate of the transfer cycles is advantageously chosen equal to a submultiple of a processing cycle of the transmitting unit involved in a given exchange miniprogram so that a readout of data stored in the memory ME of that unit occurs after a predetermined number of such processing cycles; this number, of course, may be different for the various miniprograms.

After the last transfer cycle, the cycle count in the accumulator stage of register AB here considered reads zero whereupon circuit CG" commands the rate register RF to send out the termination signal previously stored therein, this signal being successively sent to the three participating units $UA_o$, $UA_t$, $UA_r$ for restoring them to their normal, autonomous mode of operation.

The circuit elements of unit DEC shown in FIG. 3 can be modified in a variety of ways which will be readily apparent to persons skilled in the art. Thus, for example, the address codes of the participating miniprocessors need not be stored in the same register (AB) which counts the number of transfer cycles remaining in the miniprogram and which has therefore been designated as a decrementing accumulator.

Figure 4:
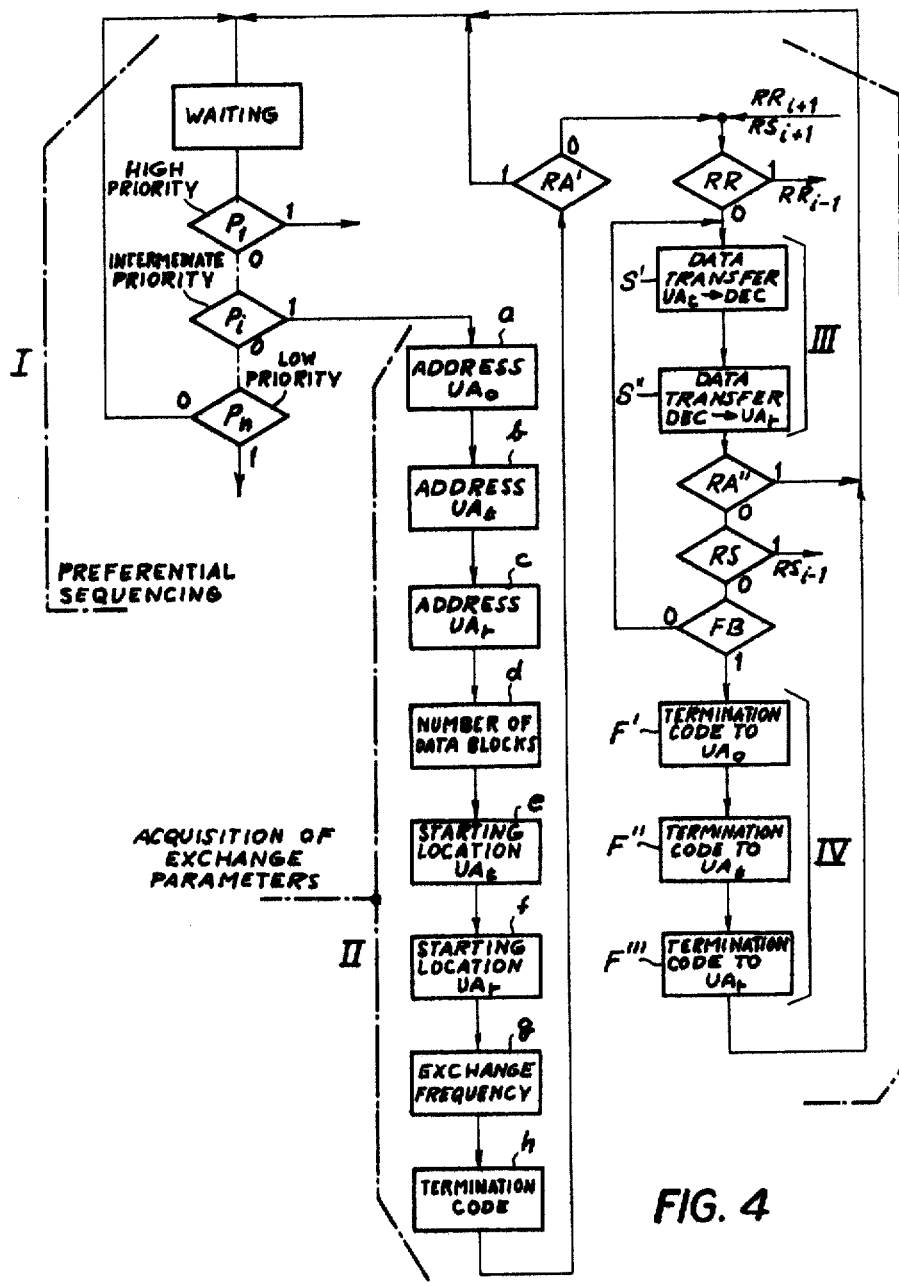
FIG. 4 is a flow chart showing the sequence of operations in a data-exchange miniprogram involving certain processing units of the system.

We shall now describe, with reference to FIG. 4, the evolution of a complete miniprogram carried out in a system according to our invention. Part I of this flow chart illustrates the preferential sequencing of accepted exchange requests according to assigned priority levels $p_1, \ldots p_i, \ldots p_n$, with progressively decreasing rank so that level $p_1$ takes precedence over all the others. The number $n$ of priority levels may be the same as the number of miniprocessors in each subsystem (cf. FIG. 1), in which case the control unit DEC will be able to accommodate all requests coming in from associated miniprocessors.

When no exchange miniprogram is in progress, or when a requested exchange is suspended because of temporary unavailability of a miniprocessor to be involved in it, the control unit is in a waiting state while the associated miniprocessors — including any with unexecuted requests — can perform their autonomous operations.

Let us consider, by way of example, a miniprogram to which the timer CG" of FIG. 3 has assigned the priority level or rank $p_i$. During the acquisition period, represented by part II of the flow chart, steps (a) through (h) described above are successively performed as the control unit dialogues with the originating miniprocessor $UA_o$.

A decision element RA', such as a flip-flop forming part of circuit CG', is set (output "1") if a busy signal from either of units $UA_t$, $UA_r$ dictates a suspension of the miniprogram on priority level $p_i$ and in that case directs the circuit CG" to resume its sequencing operation with initiation of a lower-ranking exchange miniprogram if one is requested. As soon as this decision element is reset (output "0") by an incoming availability signal, another decision element RR determines whether the exchange should proceed on the selected level $p_i$ or whether a jump to a higher priority level such as $p_{i-1}$ should occur, e.g. when a suspended miniprogram on that level is resumed upon the arrival of an availability signal; theis condition, indicated by a legend $PR_{i-1}$, is established by a setting (output "1") of element RR. At this juncture, as indicated by a legend $RR_{i+1}$, a previous suspension on level $p_i$ may be lifted by a jump from a lower priority level such as $p_{i+1}$. These jumps, of course, can be carried over several levels if there are no waiting miniprograms of intervening ranks.

If decision element RR, too, is reset (output "0"), the first cycle of a transfer period represented by part III of the flow chart is performed with a data block delivered from a designated stage of data memory ME (FIG. 2) of transmitting unit $UA_t$ to buffer register SD (FIG. 3) of unit DEC during a phase S' and subsequent retransmission of this data block to a designated stage of receiving unit $UA_r$ during a phase S". Thereafter, a set state (output "1") of a decision element RA" re-establishes the preferential sequence if, for example, a higher-ranking exchange request has arrived in the interim. With element RA" reset (output "0"), a further decision element RS commands a jump to a higher priority level such as $p_{i-1}$, e.g. upon resumption of a previously suspended miniprogram on that level, if it is in a set stage (output "1") as indicated by a legend $RS_{i-1}$ at element RS and by a corresponding legend $RS_{i+1}$ at element RR; otherwise, i.e. if that element is reset (output "0"), a decision element FB comes into play. Element FB is set (out "1") by a signal on line 51 (FIG. 3) indicating a zero count in the corresponding accumulator stage of register AB; in its reset state (output "0"), element FB initiates another transfer cycle.

At the end of transfer period III, with decision element FB set, the restoration period represented by part IV of the flow chart commences with the sending of the terminating code, stored in register RF, to originating unit $UA_o$ in a cycle F'. In two following cycles F" and F''', the termination code is also sent to units $UA_t$ and $UA_r$. Timer CG" now clears the corresponding register stages of instruction section GPS and restores the control unit DEC to its waiting state from which it may switch immediately to another priority level.

Decision elements RR and RS, permitting a jump between different priority levels, facilitate the intercalation of transfer cycles of two or more exchange miniprograms executed concurrently, with or without lengthening of the pauses between transfer cycles determined by their exchange frequencies inscribed in respective stages of rate register RF.

We claim:

1. In an electronic data-processing system, in combination:

a plurality of mutually independent miniprocessors with individually programmed operating cycles, each miniprocessor including a data store containing a series of data blocks;

a control unit connected to all said miniprocessors and responsive to a request from an originating miniprocessor, designating a transmitting miniprocessor and a receiving miniprocessor, for establishing an exchange miniprogram for the consecutive transfer of a selected number of data block during respective transfer cycles from said transmitting miniprocessor to said receiving miniprocessor;

timing means in said control unit dividing each of said transfer cycles into a first phase and a second phase;

instruction-register means in said control unit for temporarily storing, during the execution of said exchange miniprogram, the identities of said transmitting and receiving miniprocessors together with information identifying the data block to be consecutively transferred;

a buffer register in said control unit responsive to signals from said timing means for temporarily storing a data block read out from said transmitting miniprocessor during said first phase of a transfer cycle and for forwarding the stored data block to the receiving miniprocessor during said second phase of the same transfer cycle; and interface circuitry controlled by said timing means and responsive to the contents of said instruction-register means for establishing a transfer path for incoming data blocks from said transmitting miniprocessor to said buffer register during said first phase and a transfer path for outgoing data blocks from said buffer register to said receiving miniprocessor during said second phase.

2. The combination defined in claim 1 wherein said instruction-register means is divided into a plurality of stages for the concurrent storage of information relating to different exchange miniprograms performed in time-division mode under the control of said timing means.

3. The combination defined in claim 2 wherein said stages correspond to different priority levels assigned by said timing means to the respective exchange miniprograms, said time-division mode following an order to preference conforming to said priority levels.

4. The combination defined in claim 1 wherein said instruction-register means includes a first register for the storage of said selected number of data blocks included in said exchange miniprogram, said instruction-register means further including a second register for the storage of the addresses of locations in the data stores of said transmitting and receiving miniprocessors.

5. The combination defined in claim 4 wherein said addresses are consecutively numbered, said first register including first accumulating means responsive to counting pulses from said timing means for decrementing the stored number of data blocks upon the completion of each transfer cycle of said miniprogram, said second register including second accumulating means responsive to counting pulses from said timing means for incrementing the stored addresses of said locations upon the completion of each transfer cycle.

6. The combination defined in claim 5 wherein said instruction-register means further includes an additional register for the storage of instructions from said originating miniprocessor relating to the timing of said transfer cycles, said additional register being operable to emit a termination signal to said originating, transmitting and receiving miniprocessors in response to a command generated by said first accumulating means upon reduction of said stored number of data blocks to zero.

7. In an electronic data-processing system, in combination:
- a multiplicity of mutually independent miniprocessors with individually programmed operating cycles, said miniprocessors being grouped in a plurality of subsystems and including each a data store containing a series of data blocks;
- a control unit in each subsystem connected to all said miniprocessors and responsive to a request from an originating miniprocessor in its own subsystem, designating a transmitting miniprocessor and a receiving miniprocessor, for established an exchange miniprogram for the consecutive transfer of a selected number of data blocks during respective transfer cycles from said transmitting miniprocessor to said receiving miniprocessor;
- timing means in each control unit dividiing each of said transfer cycles into a first phase and a second phase;
- instruction-register means in each control unit for temporarily storing, during the execution of said exchange miniprogram, the identities of said originating, transmitting and receiving miniprocessors together with information identifying the data blocks to be consecutively transferred;
- a buffer register in each control unit responsive to signals from said timing means for temporarily storing a data block read out from said transmitting miniprocessor during said first phase of a transfer cycles and for forwarding the stored data block to the receiving miniprocessor during said second phase of the same transfer cycle; and
- interface circuitry controlled by said timing means of each control unit and responsive to the contents of said instruction-register means thereof for establishing a transfer path for incoming data blocks from said transmitting miniprocessor to said buffer register during said first phase and a transfer path for outgoing data blocks from said buffer register to said receiving miniprocessor during said second phase.

8. The combination defined in claim 7 wherein said instruction-register means is divided into a plurality of stages for the concurrent storage of information relating to different exchange miniprograms performed in time-division mode under the control of said timing means according to an order of preference based on different priority levels assigned by said timing means to the respective exchange miniprograms, said timing means being responsive to temporary unavailabilty of a miniprocessor involved in a requested high-priority exchange miniprogram, for carrying out at least part of a concurrently requested lower-priority exchange miniprograms.

9. The combination defined in claim 7 wherein said interface circuiting means includes a transmitting interface and a receiving interface in each subsystem, a bus in each subsystem connected in parallel to said transmitting and receiving interfaces, said control unit and said miniprocessors thereof, and branch connections extending between transmitting and receiving interfaces of different subsystems.

10. The combination defined in claim 9 wherein said branch connections interlink the transmitting and receiving interfaces of all subsystems in a closed circuit for one-way data transmission.

* * * * *